United States Patent [19]

Blair

[11] 4,032,184
[45] June 28, 1977

[54] ROUND BALE LOADER

[76] Inventor: Calvin B. Blair, P.O. Box 97, Barnard, Kans. 67418

[22] Filed: Feb. 9, 1976

[21] Appl. No.: 656,337

[52] U.S. Cl. .............................. 294/88; 214/147 G; 214/653

[51] Int. Cl.² ......................................... B66C 1/28

[58] Field of Search ............ 294/67 R, 67 A, 67 B, 294/67 BB, 67 BC, 63 R, 81 R, 88, 106, 107; 214/147 R, 147 G, 621, 651, 653, 654, 731, DIG. 4

[56] References Cited

UNITED STATES PATENTS

| 2,601,933 | 7/1952 | Seagraves et al. | 214/653 |
| 2,671,571 | 3/1954 | Gerhardt | 294/88 X |
| 2,775,359 | 12/1956 | Carpenter | 214/653 |
| 2,975,918 | 3/1961 | Sharp | 294/88 X |
| 3,000,522 | 9/1961 | Grange | 214/653 X |
| 3,372,824 | 3/1968 | Callahan | 214/653 X |
| 3,908,846 | 9/1975 | Brummitt | 214/147 G |
| 3,946,887 | 3/1976 | Parker | 214/653 |

FOREIGN PATENTS OR APPLICATIONS 975,212  11/1964  United Kingdom ........... 214/147 R Primary Examiner—Johnny D. Cherry
Attorney, Agent, or Firm—Fishburn, Gold & Litman

[57] ABSTRACT

A round bale loader attachment is adapted for use with conventional farm tractor front end loaders and has forwardly extending, generally parallel arms mounted for free pivotal movement about longitudinal axes thereof, permitting a semi-cradling of the bales for efficient handling with minimal lateral squeezing. Simple structure is provided for varying the space between the arms, and hitch means secure the attachment to the loader for manipulation by the tractor operator.

8 Claims, 8 Drawing Figures

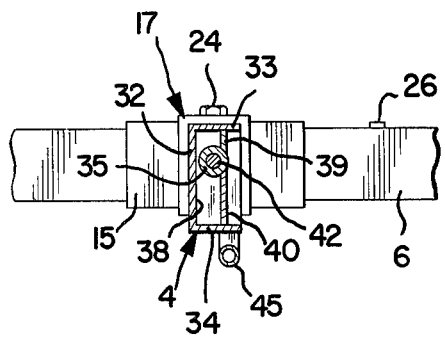
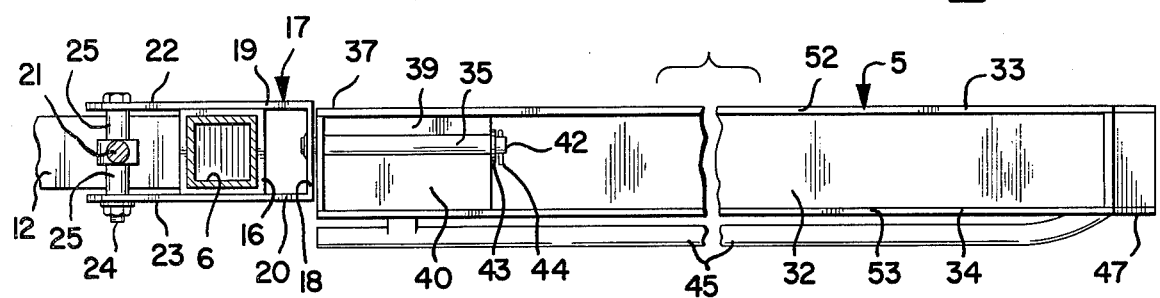
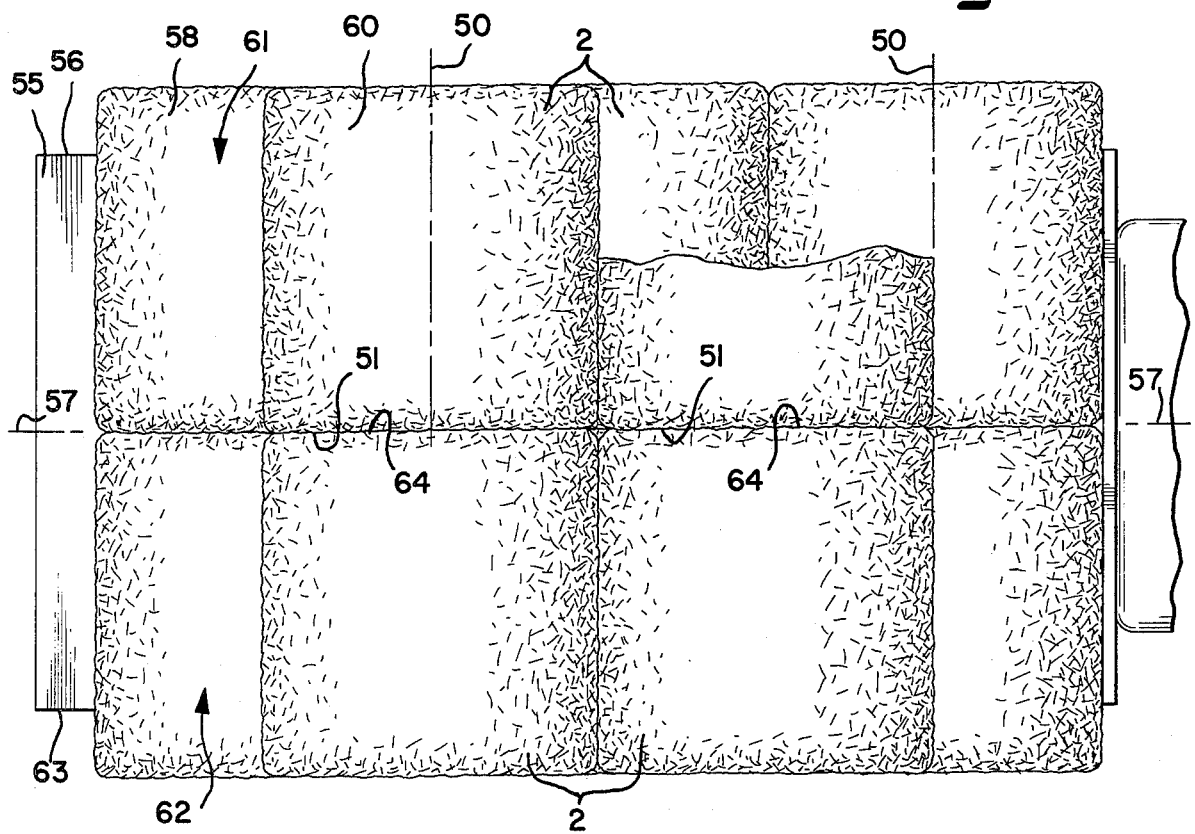

ROUND BALE LOADER

The present invention relates to equipment particularly adapted for handling large, round hay bales. Modern livestock operations are finding increasing use for the large, round hay bale due to the efficiency which may be realized in high bulk units. This round bale is usually generally cylindrical with a diameter and length of 5 feet and a weight of about 1500 pounds. Therefore, manual handling is not feasible and machinery is required for forming, lifting and moving such bales.

Existing apparatus for handling round bales include various forks, clamps, scoops and spindling devices, however, they tend to be inefficient and/or expensive in construction. Industrial type fork lifts have been suggested, but these tend to be unsatisfactory since the lateral distance between the fork teeth are usually preset to a certain width less than the diameter of the bale. In driving the forks beneath the bale, there is a tendency to snag the baling wire or rope and during transportation, the bale is relatively unstable and likely to fall. Other devices employ spikes or tines which are driven into the bale, but there are, among other problems, difficulties in separating the bale from the grasping structures and in manipulation without complex control devices. Still other handling machines suggested employ clamping arms; however, the heavy structure and power actuation member needed for horizontal clamping makes this undesirable. The present invention avoids the above difficulties by providing a round bale handling mechanism which is simple and yet effective.

The principal objects of the present invention are: to provide an improved device for lifting and carrying round bales; to provide such a device that is adapted to be easily attached to a farm tractor front end loader; to provide such a device having forwardly projecting arms which pivot freely about longitudinal axes thereof whereby, upon engagement with the cylindrical surface of a round bale, tends to cradle same; to provide a device which does not depend on large clamping forces to support a round bale; to provide such a device which may engage a bale with minimum likelihood of damage thereto; to provide such a device which is capable of efficiently loading and unloading round bales in a multilayered stack in which the bales are oriented with their axes horizontal; to provide such a device which is capable of easily loading and unloading round bales from a flat bed vehicle; to provide such a device which is easily tilted for resting a round bale on one end; and to provide a round bale loader which is economical to manufacture, efficient and durable in use, and particularly well adapted for its intended purpose.

Other objects and advantages of this invention will become apparent from the following description taken in connection with the accompanying drawings, wherein are set forth by way of illustration and example certain embodiments of this invention.

The drawings constitute a part of this specification and include exemplary embodiments of the present invention and illustrate various objects and features thereof.

FIG. 3 is a fragmentary transverse cross-sectional view through one arm of the round bale loader, taken on line 3—3, FIG. 2 on a further enlarged scale.

FIG. 4 is a fragmentary side elevational view of the other arm of the round bale loader, taken on the line 4—4, FIG. 2 on the same scale as FIG. 3.

FIG. 5 is a plan view illustrating a pattern of stacking roung bales on a vehicle bed which can be effectively utilized by the round bale loader.

Figure 1:
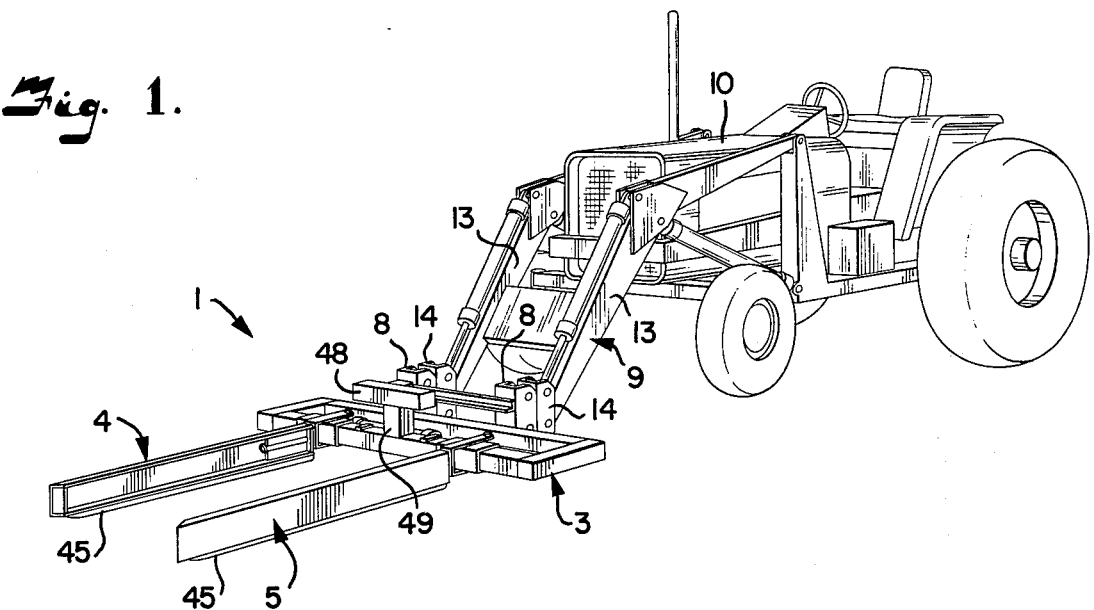
FIG. 1 is a perspective view of a round bale loader embodying this invention, shown attached to the front end loader mechanism of a farm tractor.
Figure 2:
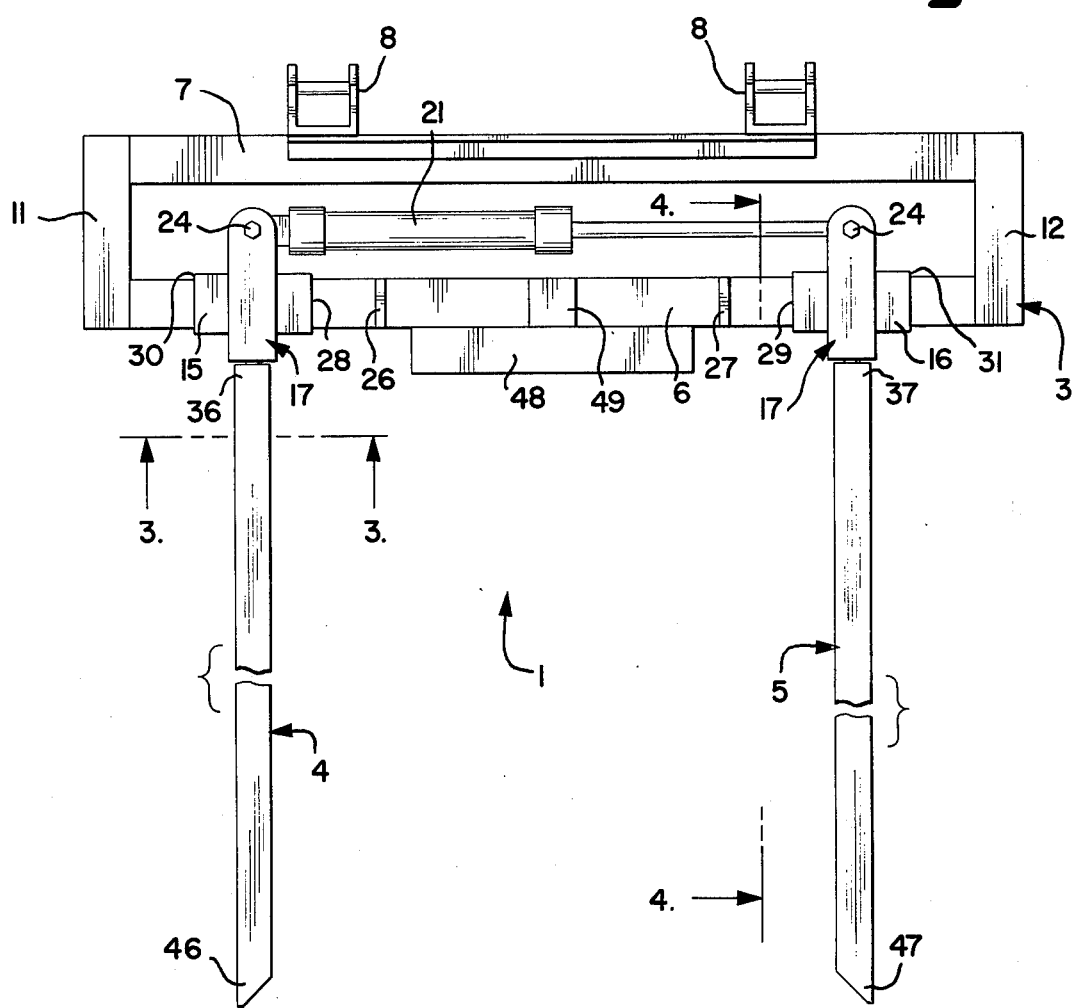
FIG. 2 is a plan view on a larger scale, of the round bale loader.

Referring to the drawings in more detail:

The reference numeral 1 generally designates a round bale loader for lifting a round hay bale 2, or the like, to transfer same between desired locations. The round bale is of the type which is generally cylindrical, having a diameter of about 5 feet, a length of a similar dimension and weighing roughly 1500 pounds. The loader 1 comprises a transversely extending, normally horizontal support frame 3 having a pair of bale engaging arms 4 and 5 slidably mounted on a front beam 6 thereof. A rear beam 7 of the support frame 3 has hitch members 8 thereon for attachment to the front loader mechanism 9 of a farm tractor 10 or like service vehicle. Side beams 11 and 12 join front beam 6 and rear beam 7 in a rectangular arrangement best illustrated in FIG. 2. The support frame 3 may be constructed from any suitable structural stock, and in the illustrated arrangement, the members are square cross section, tubular beams suitably joined, as by welding.

The front loader mechanism 9 is a conventional, hydraulically actuated front loader mechanism as is employed on various tractors and similar service vehicles. Forwardly projecting lift arms 13 have hitch receiving members 14 pivotally mounted on a free end thereof and adapted to removably secure thereto hitch members 8.

A pair of spaced-apart sleeve guides 15 and 16 are sleeved or telescoped onto the front beam 6 prior to the attachment of side beams 11 and 12. Sleeve guides 15 and 16 are illustrated here as short lengths of square tubular cross-section stock, slightly larger in size than beam 6 to provide sliding clearance. A generally C-shaped arm supporting bracket 17, having a front web 18 and rearwardly projecting top and bottom legs 19 and 20, is joined respectively to each of the sleeve guides 15 and 16, as by welding.

An hydraulic cylinder 21, having opposite ends thereof secured to the respective brackets 17, is operative to move sleeve guides 15 and 16 toward and away from each other. Rear extensions 22 and 23, respectively, of top and bottom legs 19 and 20, have aligned apertures (not shown) therein and each receives a bolt 24 passing therethrough and through one of the ends of the hydraulic cylinder 21. Tubular spacers 25 are sleeved onto the bolt 24 for maintaining the respective end of cylinder 21 at the proper position along the bolt 24, and also provide reinforcement. A suitable nut and washer is threaded onto bolt 24 to complete the assembly.

In order to limit the sliding range of the sleeve guides 15 and 16, stops 26 and 27 are attached to the front beam 6 between the sleeve guides 15 and 16. Stops 26 and 27 are here illustrated as bars attached to the upper surface of the front beam 6 by welding, although they may be effectively attached to any side or face thereof. Stops 26 and 27 provide a minimum spacing limit between sleeve guides 15 and 16 by the engagement thereof with respective inner edges 28 and 29 of sleeve guides 15 and 16. A maximum spacing limit between sleeve guides 15 and 16 is here provided by the engagement of respective outer edges 30 and 31 thereof with side beams 11 and 12 of the support frame 3.

Bale engaging arms 4 and 5 are mounted to the arm support brackets 17 for free pivotal movement about respective longitudinal axes thereof. Arms 4 and 5 may be formed of any suitable structural stock, preferably having a quasi-rectangular cross-section for reasons later discussed. Arms 4 and 5 are here illustrated as channel members each having a web 32, respective top and bottom flanges 33 and 34, and a length of approximately 5 feet in order to engage a substantial longitudinal length of the bale cylindrical surface. In cross-section, the web 32 is longer than the flanges 33 and 34, and the arms 4 and 5 are mounted with the center of gravity below the pivot point so that the webs 32 normally tend to hang generally vertically and the flanges 33 and 34 generally horizontally.

An elongated bearing tube 35 is mounted adjacent the respective rear ends 36 and 37 of the arms 4 and 5 in a direction substantially parallel with respective longitudinal axes thereof, and, as noted above, at a height spaced above the cross-sectional center of gravity. Bearing tubes 35 are illustrated as being located adjacent the inner surfaces 38 of webs 32 and supported by upper and lower bracing plates, respectively 39 and 40, welded thereto and respectively to top and bottom flanges 33 and 34.

The front webs 18 of supporting brackets 17 each have an elongated pivot pin 42 rigidly secured thereto and projecting forwardly thereof. Arms 4 and 5 are mounted on the brackets 17 by sleeving the bearing tubes 35 onto the pivot pins 42, a suitable washer 43 and cotter pin 44 being employed to secure the assembly.

In order to facilitate moving the round bale loader 1 into operational position across a bale supporting surface, such as the ground, and to minimize damage to adjacent bales in a stack, an elongated runner 45 is attached to a lower surface of the bottom flanges 34. The runners 45 are here illustrated as tubular members attached adjacent respective arm rear ends 36 and 37 and front ends 46 and 47, as by welding. The front ends of runners 42 are preferably curved upwardly as best shown in FIG. 4.

In order to insure optimum location of the bale on the arms and limit arm penetration into a stack of bales 2, and to further prevent a bale 2 from sliding rearwardly of front beam 6 when round bale loader 1 is being carried in a tilted-back position, an elongated, horizontal bale stabilizer 48 is mounted on the front beam 6 and spaced vertically therefrom. In this example, a stabilizer standard 49 is secured on the top surface of the front beam 6, as by welding, the stabilizer 48 being mounted on a front surface thereof.

In using the bale loader 1 to pick up bales 2 that are supported on a flat surface, such as the ground, by one procedure the tractor 10 is caused to approach the bale 2 in a direction parallel with the center line 50 thereof, with the arms 4 and 5 sliding on or just above the supporting surface and spread sufficiently by the cylinder 21 to provide a comfortable arm clearance from the sides of the bale at support level but substantially less than the bale diameter. The tractor is then driven forwardly until the front surface of bale stabilizer 48 engages the base or end 51 of the bale. The arms 4 and 5 are then raised while remaining generally horizontal. As inner edges 52 of the top flanges 33 engage the cylindrical surface of the bale, the arms 4 and 5 pivot about the pins 42 such that inner edges 53 of bottom flange 34 also engage the bale surface, forming a cradling action between the arms. Continued raising of the arms lifts the bale for transport. Another procedure is to approach the bale with the arms already at the desired contact elevation, but further spread apart, and to utilize the cylinder 21 to move the arms into bale cradling contact prior to lifting. The loader is then, preferably, tilted back slightly about a lower pivot 54 of the hitch receiving members 14 to prevent the bale 2 from slipping off the arms 4 and 5 during transport, and the tractor moved to the desired location, whereupon the above sequence may be reversed for bale disposition.

Figure 6:
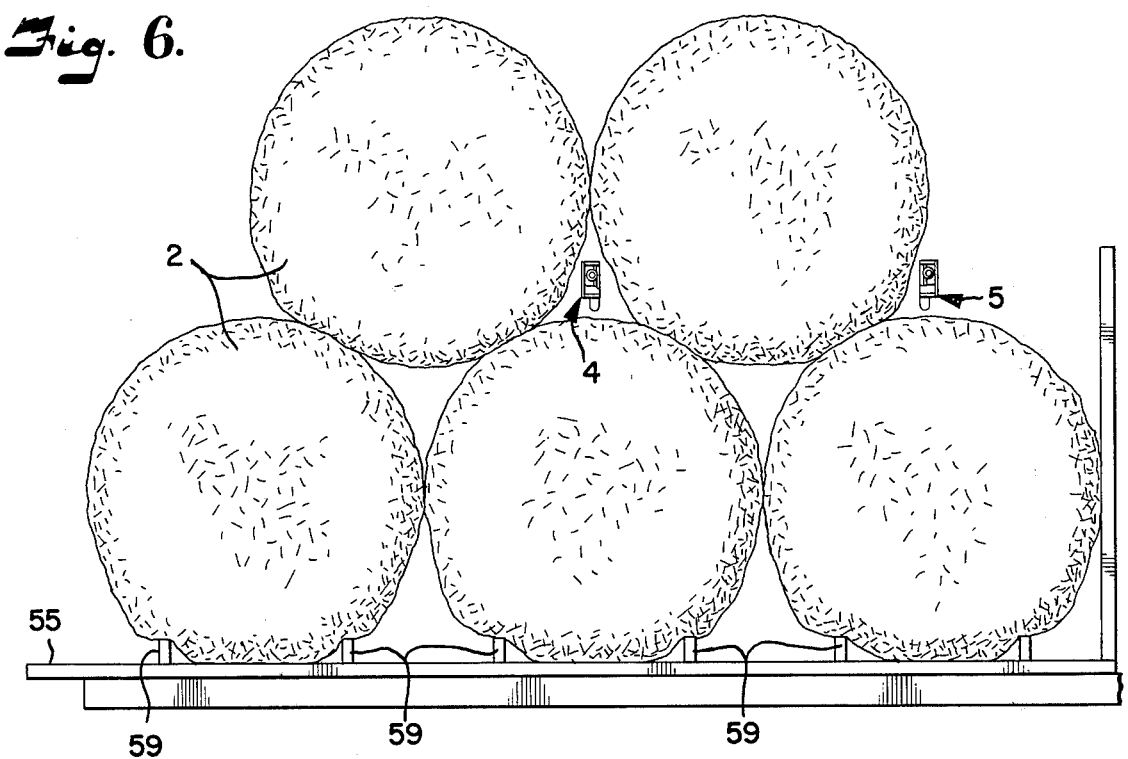
FIG. 6 is a side elevational view of the bale pattern of FIG. 5, showing insertion positions of the round bale loader arms while hanging vertically just prior to engagement with a bale.
Figure 7:
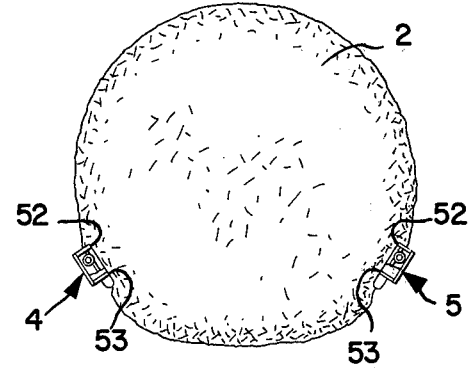
FIG. 7 is similar to FIG. 6, but showing a single hole in cradled engagement with the arms of the round bale loader.
Figure 8:
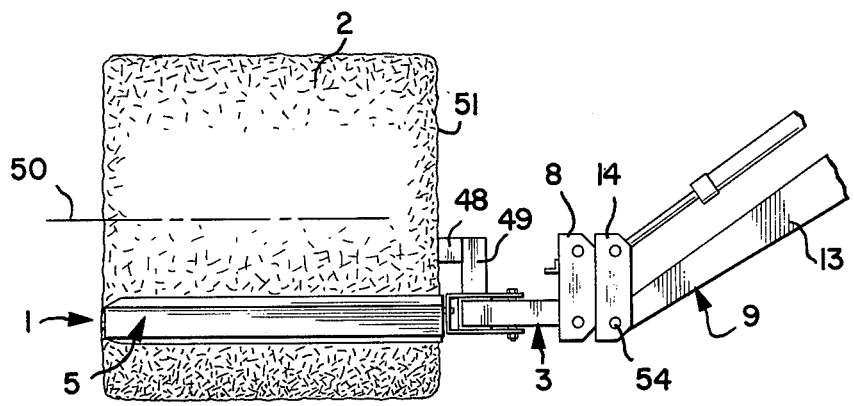
FIG. 8 is a further elevational view of the bale of FIG. 7 in cradled engagement with the arms of the round bale loader.

A method and pattern of stacking round bales 2 on a generally standard, roughly 8 by 16 foot flat bed 55 of a truck or wagon, which lends itself particularly well to the use of the loader 1, as described, is best illustrated in FIGS. 5 and 6. Bales 2 are placed along one side edge 56 of the bed 55 with bale bases 51 generally adjacent the bed center line 57, and with bale center lines 50 substantially perpendicular thereto, forming a lower layer 58. A pair of chocks 59 may be placed under each bale 2 in the lower layer 58 to reduce any tendency of the bales 2 to roll along the surface of bed 55. The chocks 59 may be lengths of standard 2 × 4 lumber, or the like, arranged perpendicular to bed center line 57 near the area of tangency between the respective bale 2 and the surface of bed 55. An upper layer 60 of bales 2, having one less bale than the number of bales in the lower layer 58, is then placed on top of the lower layer 58. The bales 2 in upper layer 60 are arranged such that the center lines 50 thereof are directly above the respective areas of tangency between adjacent bales in the lower layer 58. The lower layer 58, and upper layer 60 form a first stack 61 of bales slightly projecting over the side edge 56 of bed 55. A second stack of bales 62 identical to the first stack 61 is then placed along the other side edge 63 of bed 55, with inner bases 64 of the second stack bales abutting the bases 51 of the bales 2 in the first stack 61. The combined width of stacks 61 and 62 somewhat exceeds the width of the bed, but this is generally acceptable in producing maximum transport efficiency.

In using the bale loader 1 to remove bales 2 from the type of stack illustrated in FIGS. 5 and 6, the spacing between the arms 4 and 5 must be adjusted for simultaneous penetration into the spaces on each side of a bale free for upward lifting. The second lifting procedure wherein the cylinder 21 is used to produce the cradling action is then preferably used for securing and lifting the bale.

If it is desired to set the bale 2 onto one of its bases, the loader 1 may be tilted forwardly by the front end loader mechanism 9 about lower pivot point 54 until the bale slides downwardly onto the ground. A forward motion of the tractor during sliding may aid in upending the bale.

It is to be understood that although certain forms of this invention have been illustrated and described, it is not to be limited thereto except insofar as such limitations are included in the following claims.

What is claimed and desired to be secured by Letters Patent is:

1. A device for handling a round hay bale having a substantially cylindrical surface and opposite bases comprising:
   a. a frame adapted for manipulation by a tractor loader;
   b. a pair of projecting pin members on said frame;
   c. means for moving said pin members laterally toward and away from each other;
   d. a pair of generally parallel and projecting arms respectively having a bale engaging inner surface and mounted on said projecting pin members, said arms being freely pivotable on said pin members about respective longitudinal axes thereof;
   e. said arms being in cross section a greater height than width with said pin member having mounted above the respective center of gravity of said arms whereby said arms hang vertically oriented when not in lifting contact with said bale surface, said arms pivoting so that said inner surfaces conform to said bale surface when in lifting contact therewith and subsequently return to vertical orientation when the bale is released.

2. The device as set forth in claim 1 wherein:
   a. said frame includes a front beam, a rear beam, and spaced apart side beams joined together in a rectangular arrangement.

3. The device as set forth in claim 2 including:
   a. an elongated bale stabilizer mounted on said frame and spaced vertically therefrom, said stabilizer projecting forwardly not substantially less than the forward-most portion of said frame.

4. The device as set forth in claim 1 wherein:
   a. said frame includes a rear beam, and further including hitch means on said rear beam and adapted to be removably attached to said tractor loader.

5. The device as set forth in claim 1 wherein:
   a. said frame includes a transversely extending front beam; and
   b. a pair of sleeves respectively supporting said arms, said sleeves engaging said front beam and slidable therealong for varying the distance between said arms.

6. The device as set forth in claim 5 including:
   a. slide limit means on said front beam for limiting the sliding range of said sleeves.

7. The device as set forth in claim 5 wherein said pin moving means includes
   a. an extendible motor member having opposite ends respectively operably attached to said sleeves and functional to move said sleeves toward and away from each other.

8. The device as set forth in claim 1 wherein:
   a. each of said arms has a lower surface and a front end; and including
   b. an elongated runner attached to each of said lower surfaces and upwardly curved adjacent said arm front ends to reduce snagging tendencies during sliding along a surface.

* * * * *